United States Patent
O'Leary

(10) Patent No.: US 8,654,723 B2
(45) Date of Patent: Feb. 18, 2014

(54) METHOD AND DEVICE FOR RE-USING IPSEC TUNNEL IN CUSTOMER PREMISES EQUIPMENT

(75) Inventor: Edward A. O'Leary, Ajax (CA)

(73) Assignee: Rogers Communications Inc., Toronto (CA)

( * ) Notice: Subject to any disclaimer, the term of this patent is extended or adjusted under 35 U.S.C. 154(b) by 473 days.

(21) Appl. No.: 13/040,343

(22) Filed: Mar. 4, 2011

(65) Prior Publication Data

US 2012/0224566 A1    Sep. 6, 2012

(51) Int. Cl.
*H04W 4/00*    (2009.01)
*H04W 28/04*    (2009.01)

(52) U.S. Cl.
CPC ..................................... *H04W 28/04* (2013.01)
USPC ........... 370/329; 370/310; 370/328; 370/331; 370/338; 370/352; 370/389

(58) Field of Classification Search
None
See application file for complete search history.

(56) References Cited

U.S. PATENT DOCUMENTS

| | | | |
|---|---|---|---|
| 2008/0130564 A1* | 6/2008 | Gallagher et al. | 370/329 |
| 2008/0261563 A1 | 10/2008 | Drevon et al. | |
| 2011/0216743 A1* | 9/2011 | Bachmann et al. | 370/331 |

FOREIGN PATENT DOCUMENTS

WO    2009139674 A1    11/2009

OTHER PUBLICATIONS

Partho Choudhury and Deepak Kahuja of Hughes Systique Corporation, "UMA and Femtocells: Making FMC Happen", Annual Review of Communications, vol. 61, pp. 285-295.

* cited by examiner

*Primary Examiner* — Faruk Hamza
*Assistant Examiner* — Aixa A Guadalupe-Cruz
(74) *Attorney, Agent, or Firm* — Ridout & Maybee LLP

(57) ABSTRACT

A method for re-using an existing IPSec tunnel for multiple services. The IPSec tunnel is established from customer premises equipment to the core network to support licensed frequency communications, such as a femtocell. UMA communication using unlicensed frequencies may be carried out by re-using the IPSec tunnel to securely route UMA communications from a UMA device to a UNC within the core network via the customer premises equipment. The network determines whether to redirect UMA communications through an existing IPSec tunnel by determining whether a newly established second IPSec tunnel for UMA communications originates from an access point collocated with a femtocell that has an existing IPSec tunnel.

22 Claims, 14 Drawing Sheets

METHOD AND DEVICE FOR RE-USING IPSEC TUNNEL IN CUSTOMER PREMISES EQUIPMENT

FIELD

The present application generally relates to wireless devices and, in particular, to methods of connecting a range of possible devices that use IPSec tunnels individually to a common IPSec tunnel established between a customer premises equipment device and a core network security gateway.

BACKGROUND

With the proliferation of IP based services, and Wireless and Fixed operators (TSP, Telecommunication Service Providers) extending their core services over managed and unmanaged Internet services, the need to provide the same level of security, and privacy as provided over their existing networks was paramount. The industry chose to use Internet Protocol Security (IPSec) as the base protocol to extent services from their core networks.

However these services are extended on a peer to peer relationship, ie one IPSec tunnel per subscriber. This can lead to large Virtual Private Network (VPN) farms.

With the introduction of Home node B and e Home node B, femto base stations, groups of subscribers could be supported using one IPSec tunnel. Additional features are also provided with femtocells, such as local IP break out, and service awareness which enhance the user experience. It is possible to extend the concept further to include additional services which have been in the industry such as UMA/GAN devices which also use IPSec tunnels to connect to the core network, and fixed line VoIP (Voice over IP) clients and enterprise systems that use Wireless devices and VoIP clients and need connectivity to TSP's core networks to enhance services and mobility.

It would be advantageous to provide for a device, system and method that addresses, at least in part, one or more of these issues.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
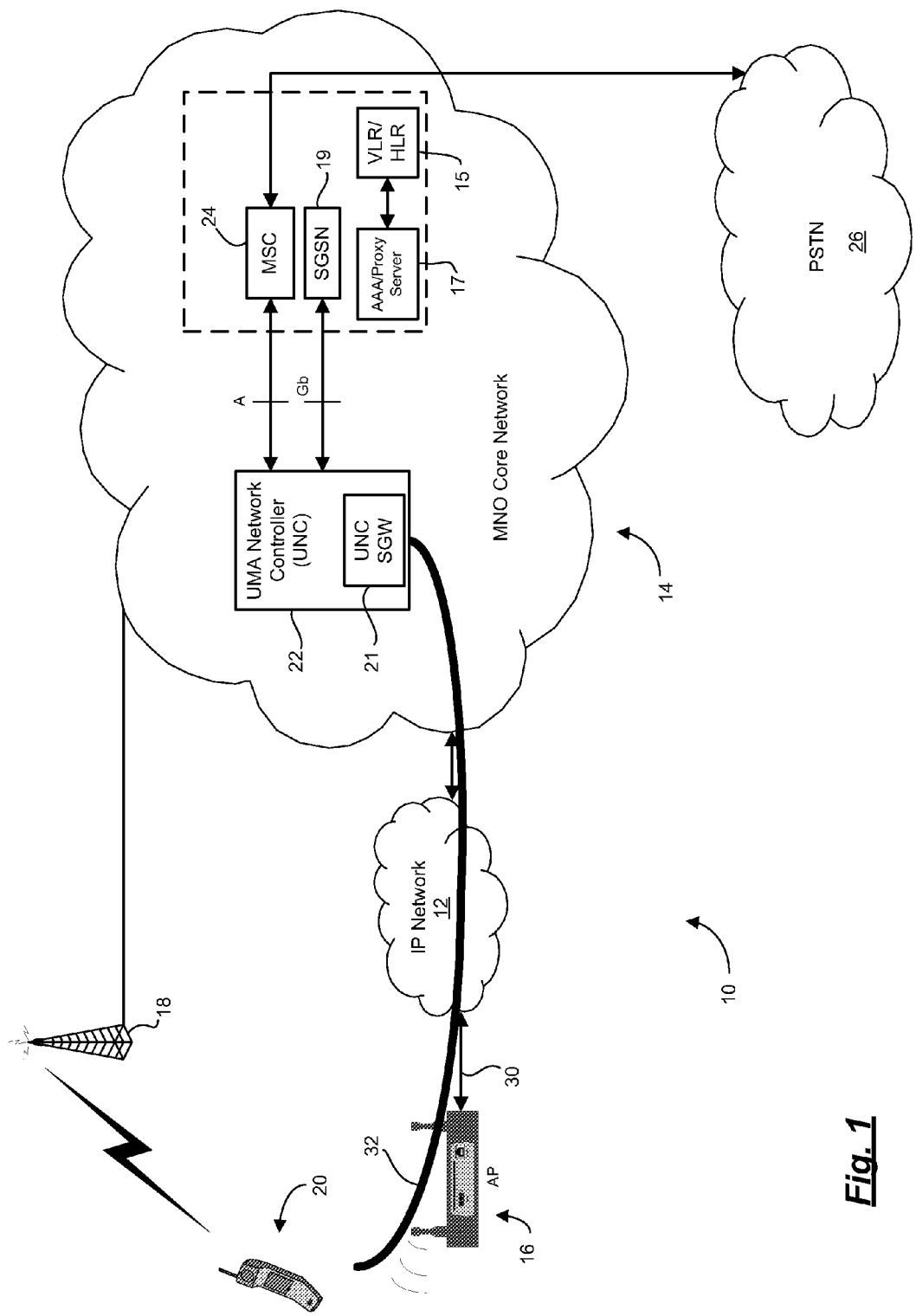
FIG. 1 shows an example UMA system.

The present application describes architectures, methods and processes for reusing existing IPSec tunnels that are commonly found in various devices and applications to provide secure communications. In one implementation, by using these enhancements, it is possible to enhance the user experience for a UMA device by shortening the connection time required to establish a secure session, because an existing IPSec session is reused. Some embodiments includes network devices and/or processes that facilitate the connection of devices to MNO core networks for services such as VoIP, UMA and Femtocell using a shared IPSec connection.

In one aspect, the present application describes a method of providing unlicensed mobile access (UMA) service at a customer location, the customer location having customer premises equipment connected to a public IP network, wherein the customer premises equipment includes a licensed frequency interface and an unlicensed frequency interface. The method includes establishing a first IPSec tunnel from the customer premises equipment to a secure gateway within a mobile network operator (MNO) network over the public IP network to support communications over the licensed frequency interface; establishing a second IPSec tunnel from a dual-mode mobile device to a UMA network controller (UNC) via the unlicensed frequency interface, for a UMA service; determining that the unlicensed frequency interface is collocated with the licensed frequency interface in the customer premises equipment; sending the dual-mode mobile device a redirect message instructing the mobile device to route communications relating to the UMA Service through the first IPSec tunnel; and receiving communications relating to the UMA Service through the first IPSec tunnel and routing the communications to the UNC.

In another aspect, the present application discloses a mobile network server, providing unlicensed mobile access (UMA) service at a customer location, the customer location having customer premises equipment connected to a public IP network, wherein the customer premises equipment includes a licensed frequency interface and an unlicensed frequency interface, wherein the customer premises equipment is configured to establish a first IPSec tunnel from the customer premises equipment to a secure gateway over the public IP network to support communications over the licensed frequency interface. The mobile network server includes a processor; a memory; and an application stored in memory and containing instructions for configuring the processor to establish a second IPSec tunnel from a mobile device to the mobile network server, via the unlicensed frequency interface, for a UMA service, determining that the unlicensed frequency interface is collocated with the licensed frequency interface in the customer premises equipment, send the mobile device a redirect message instructing the mobile device to route communications relating to the UMA service through the first IPSec tunnel, and receive communications relating to the UMA service through the first IPSec tunnel and routed via the secure gateway.

In yet a further aspect, the present application discloses a method of providing unlicensed mobile access (UMA) service to a dual-mode mobile device at a customer location, the customer location having customer premises equipment connected to a public IP network, wherein the customer premises equipment includes a licensed frequency interface and an unlicensed frequency interface. The method includes establishing an IPSec tunnel from the customer premises equipment to a secure gateway within a mobile network operator (MNO) network over the public IP network to support communications over the licensed frequency interface; broadcasting a broadcast message via the unlicensed frequency interface, wherein the broadcast message includes an indicator advertising the availability of the IPSec tunnel; receiving a request for UMA services from the mobile device via the unlicensed frequency interface; routing communications relating to the UMA service through the IPSec tunnel to a UMA network controller in a mobile core network.

In one embodiment, the present application describes a scenarios in which a UMA device can connect with IPSec tunnel established by a Femtocell, and reuse that IPSec tunnel to provide UMA service, and thus not require an IPSec Tunnel to be generated by the UMA device and saving in the MNO network IPSec connections which provide Capital and Operating cost savings.

In one aspect, the present application discloses how a UMA device may obtain access to Local Break out services provide by a Femtocell which it could not otherwise use.

In yet another aspect, the present application describes means to determine that the UMA device is in the vicinity of a Femtocell and can therefore reuse the Femtocell's existing IPSec connection.

In yet a further aspect, the present application describe how an enhanced AP can advertise a common IPSec connection available for re-use.

Other aspects and features of the present application will be understood by those of ordinary skill in the art from a review of the following description of examples in conjunction with the accompanying figures.

In the description that follows, reference is made to Unlicensed Mobile Access (UMA), such as is described in technical specification UMA Architecture (Stage 2) R.1.0.4, dated May 2, 2005, or as may be modified or updated from time-to-time. UMA is an extension of GSM/GPRS mobile services into customer premises using a tunnel established over an IP network to connect equipment in the customer premises to the core network of the Mobile Network Operator (MNO). The equipment in the customer premises employs an unlicensed radio link to communicate at relatively short range with a UMA-enabled device. For example, the equipment is typically a WiFi access point using 802.11 or variations thereof to communicate with a dual-mode mobile device having both a cellular interface and a WiFi interface. At times, reference may be made to a Generic Access Network (GAN) standard or protocol or device. GAN is the 3GPP specification for UMA. The terms GAN and UMA may be used interchangeably herein.

In the description that follows, reference will be made to "licensed frequencies" and "unlicensed frequencies". The term "licensed frequencies" includes frequencies licensed for commercial use in wireless communications in a country or geographic area, such as cellular frequencies like GSM850, PCS/GSM1900, and 3G/4G AWS 1700 bands, for example. The term "unlicensed frequencies" refers to frequencies that are not licensed to a specific user, sometime referred to as "open spectrum" bands. Example unlicensed frequencies include the ISM bands at 915 MHz or at 2.4 GHz or 5 GHz. Many devices, including portable phones, RFID tags, and wireless LAN (WLAN) devices like 802.11 or Bluetooth devices, use unlicensed frequencies.

Reference is first made to FIG. 1, which shows an example UMA system 10. A dual-mode UMA device 20 uses the system 10 for wireless communications. The dual-mode UMA device 20 is configured to operate on licensed frequencies and on unlicensed frequencies. In particular, the UMA device 20 is configured for wireless RF communications with a base station 18 of a wireless wide area network (WWAN) such as a GSM, 3G, or 4G cellular network, for example, over licensed frequencies. The UMA device 20 is also configured for wireless RF communications on unlicensed frequencies with an access point of a WLAN such as an IEEE 802.11 "WiFi" network, for example.

The system 10 includes a mobile network operator (MNO) core network 14. The MNO core network 14 interconnects all the base stations 18 and provides the infrastructure for implementing the cellular service. The MNO core network 14 provides authentication services, data service, and voice services, and all the ancillary function normally associated with a commercial cellular network (also termed a public land mobile network (PLMN)). For brevity, only the voice services are illustrated. The MNO core network 14 includes a plurality of Mobile Switching Centers (MSCs) 24, only one of which is shown in FIG. 1. As will be understood, the MNO core network 14 also includes one or more home location registers (HLR) and visitor location registers (VLR), collectively shown as VLR/HLR 15. The MNO core network 14 may also includes an AAA proxy server 17 and a serving GPRS support node (SGSN) 19, among other components. The type and number of components within the MNO core network 14 will vary dependent upon network size and type (e.g. GPRS/GSM versus UMTS/LTE versus WiMAX, etc.). The MNO core network 14 is connected to the public switched telephone network (PSTN) 26 for sending and receiving calls and other data through the PSTN 22. The MNO core network 14 is also connected to one or more public IP networks 12, such as the Internet.

The dual mode GAN device 20 may be configured to update the MNO core network 14 periodically on its location. The GAN device 20 uses established protocols to measure GSM/UMTS beacon or other signals from base stations in the area. From these signals, the GAN device 20 identifies Mobile Country Code (MCC) and Mobile Network Code (MNC) data. It can also obtain other information from the signals, and can perform signal strength measurements in some cases. The GAN device may further include location-based agents, such as GPS modules or other such agents, for pinpointing device location. Such location based information may also be reported to the MNO core network 14.

The system 10 further includes one or more access points 16. For clarity, one access point 16 is illustrated in FIG. 1. The access point (AP) 16 is configured to send and receive RF communications on unlicensed frequencies using an unlicensed frequency communications protocol, such as IEEE 802.11, for example. The AP 16 is connected to the public IP network 12, such as the Internet, over a data connection 30, such as may be provided by an ISP in some cases.

When the GAN device 20 finds or is directed to find an AP 16, it attempts to attach to AP 16 and get IP connectivity to the public IP network 12 via the AP owners' data connection 30. The IP connection can be over managed or unmanaged IP facilities. Upon successfully getting IP connectivity, the GAN device 20 may attempt to connect to a predefined Security Gateway (SGW) 21. In some implementations, as illustrated in FIG. 1, the SWG 21 can be collocated with a UMA network controller (UNC) 22. The UNC 22 is also sometimes referred to as a GAN network controller (GANC). The GAN Device 20 negotiates with the SGW 21 to set up a secure IP tunnel, i.e.

an IPSec tunnel 32. The IPSec tunnel 21 provides for a secure connection for communications between the GAN device 20 and the SGW 21 in the UNC 22.

Once established, the GAN device 20 connects to a predefined UNC/GANC 22. As noted above, in some cases the SGW 21 may be collocated with the UNC/GANC 22. Once the UNC 22 has established a connection with the GAN device 20, several parameters will be collected by the UNC 22. For example, the UNC 22 may receive and store the IP address(es) used by the GAN device 20 (as may be provided by AP 16), the SSID that identifies the WLAN of which the AP 16 is a part, the MAC ID (i.e. Ethernet MACid of the AP Wireless Interface card). The UNC 22 may also obtain information regarding the GAN device's 20 connection (if any) to the MNO core network 14 or to another wireless network (not necessarily operated by the MNO), such as one or more base station IDs, the Mobile Country Code (MCC), and the Mobile Network Code (MNC). Some of these parameters, like MCC and MNC may be used by the UNC 22 to determine whether it is permitted (by regulations, roaming agreements, or otherwise) to provide UMA services to the GAN device 20. From the SGW 21 the UNC 22 may obtain the public IP address for the GAN device 20 or AP 16 or WLAN or IPSec tunnel 32.

Some or all of these parameters collected and stored by the UNC 22 may be used by the UNC 22 to determine the location of the GAN device 20. In some embodiments, these parameters give general location information, like MCC and MNC, or more specific location information such as base station IDs and, in some cases, GPS coordinates. Further discussion of location determination is provided below. Communications between the GAN device 20 and the UNC 22 over the IPSec tunnel 32 using unlicensed frequencies allow for implementation of UMA (unlicensed mobile access). UMA communications are routed from the UNC 22 to the MSC 24. This connection is transparent to the MSC 24, and it appears to the remainder of the MNO core network 14 as if the MSC 24 were handling a device attached to one of its macro base stations 18.

Figure 2:
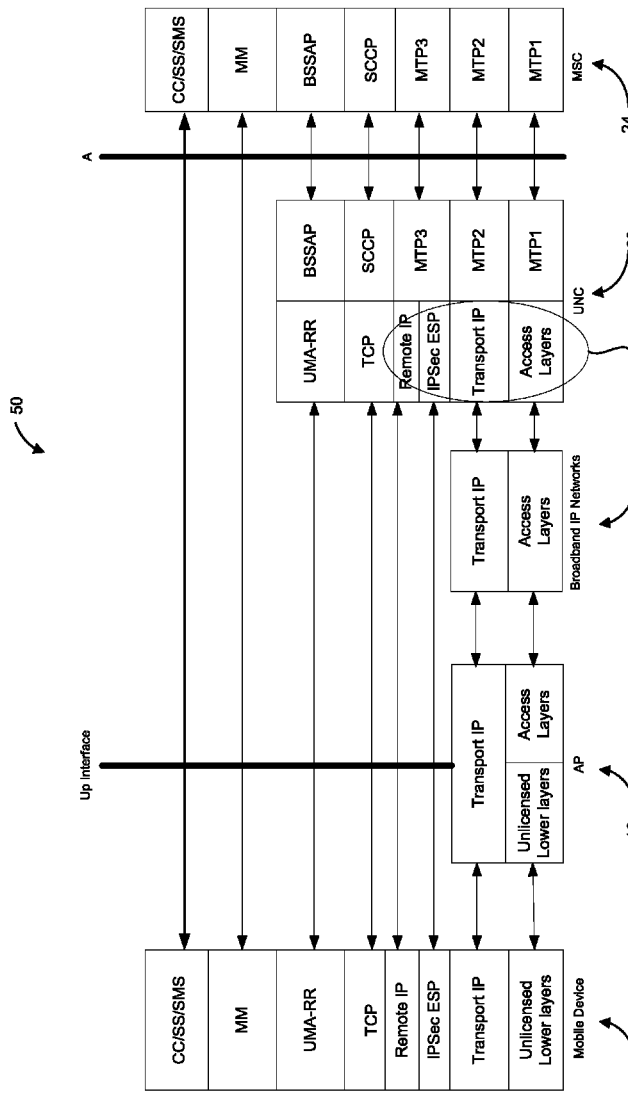
FIG. 2 shows a protocol stack for UMA communications between the GAN device and the MSC.

Reference is now made to FIG. 2, which shows a protocol stack 50 for UMA communications between the GAN device 20 and the MSC 24. The GAN device 20 and UNC 22 use the UMA protocol Up transparent tunneling of the cellular interface. The UNC 22 appears to the MSC 24 as though it were a base station 18 (FIG. 1).

Figure 3:
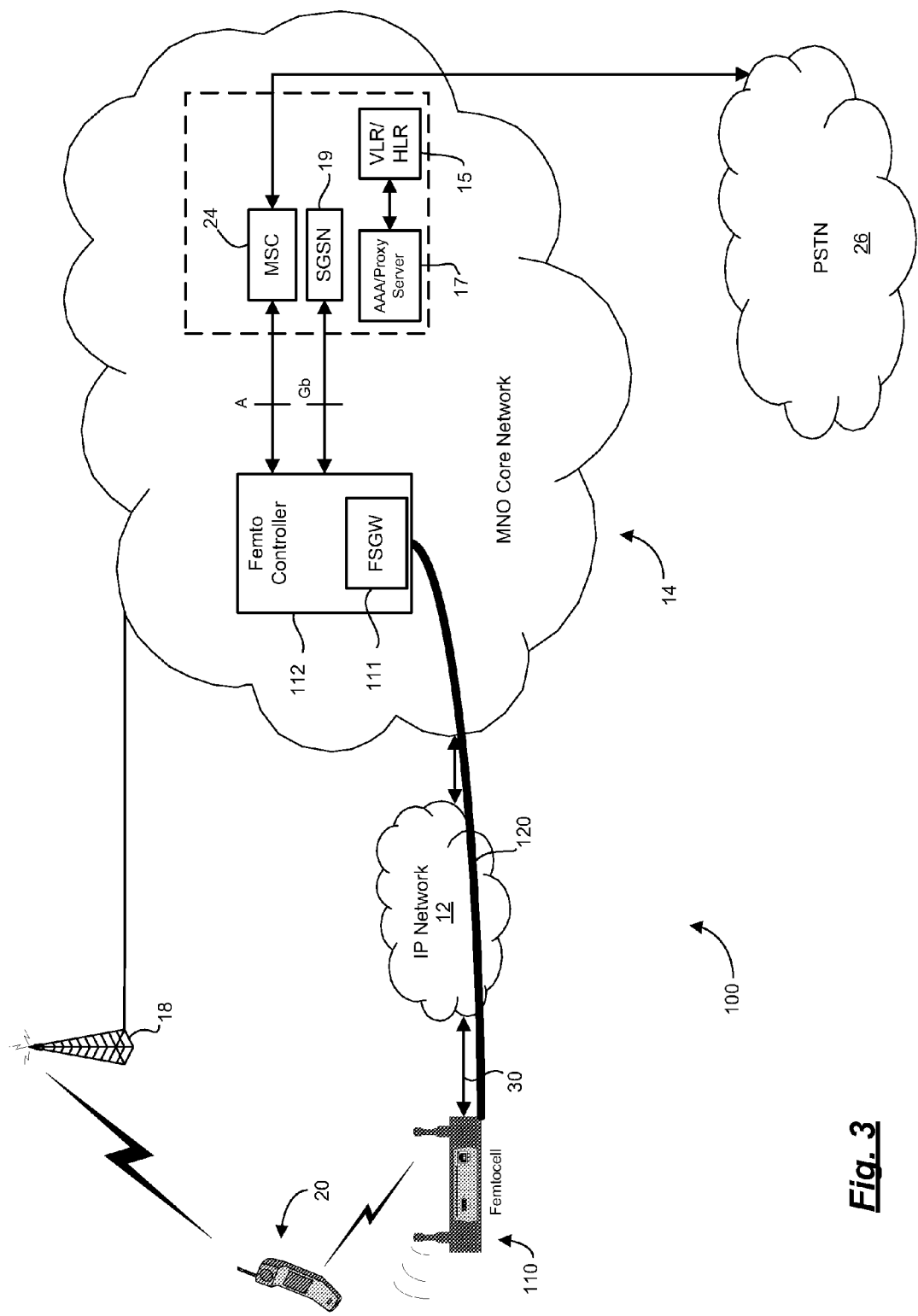
FIG. 3 shows an example femtocell system.

Reference is now made to FIG. 3, which shows another example system 100. Like the UMA system 10 (FIG. 1), the system 100 shown in FIG. 3 is configured to provide better wireless coverage for communications. However, instead of using unlicensed frequencies, such as are used by WLAN technologies, to extend the wireless network coverage, the system 100 uses femtocells 110. FIG. 3 illustrates one example femtocell 110. The femtocell 110 uses the same licensed frequency spectrum as is used by the base stations 18, but does so at a much lower power so as to confine its range to a small geographic area. In some cases, a femtocell 110 may be purchased and placed in a consumer's residence or business. The femtocell 110 is an area under license to the MNO operator. The femtocell 110 connects to the MNO core network 14 through the data connection 30 and public IP network 12. The MNO core network 14 includes a femtocontroller 112. The MNO core network 14 also includes a Femto Security Gateway (FSGW) 111. The FSGW 111 may be collocated, or integrated with, the femtocontroller 112 in some embodiments, as illustrated.

In order to connect to the femtocontroller 112, the femtocell 110 negotiates with the FSGW 111 to establish an IPSec tunnel 120. Once the IPSec tunnel 120 is established, the femtocell 110 contacts the femtocontroller 112. The femtocontroller 112 obtains and stores a number of parameters in association with the femtocell 110, such as the IP address of the femtocell 110, MAC ID of the femtocell 110, etc. It further obtains and stores location-related data regarding the femtocell 110. The location related data may be GPS data provided by a GPS module in the femtocell 110 itself. It may also or alternative be GPS data provided by a dual-mode device 20 connected to the femtocell 110. The femtocontroller 112 may alternatively obtain location-related data based upon an association between the customer or premises and the femtocontroller 112 serial number or other unique identifier. In some cases, the femtocontroller 112 may obtain location-related data based upon data from the dual mode device 20 regarding surrounding cellular base stations 18. In some embodiments, the femtocell 110 may determine and report its location directly based upon broadcast signals from surrounding base stations 18. The femtocell 110 may use triangulation or other location algorithms to determine its location from base station IDs, associated signal strength data, and location information regarding the base stations. In some embodiments, the femtocell 110 may report the base station IDs and associated signal strength information to the femtocontroller 112, which may then determine the location of the femtocell 110.

When the dual mode GAN device 20, or a regular wireless device, finds or is directed to find the femtocell 110 using commercial licensed frequencies that are also used by the macro base stations 18 or other licensed frequencies supported in the devices 20, these devices will attempt to attach to the femtocell 110 and get wireless connectivity and access to the MNO core network 14 via the all-ready-connected IPSec tunnel 120.

Figure 4:
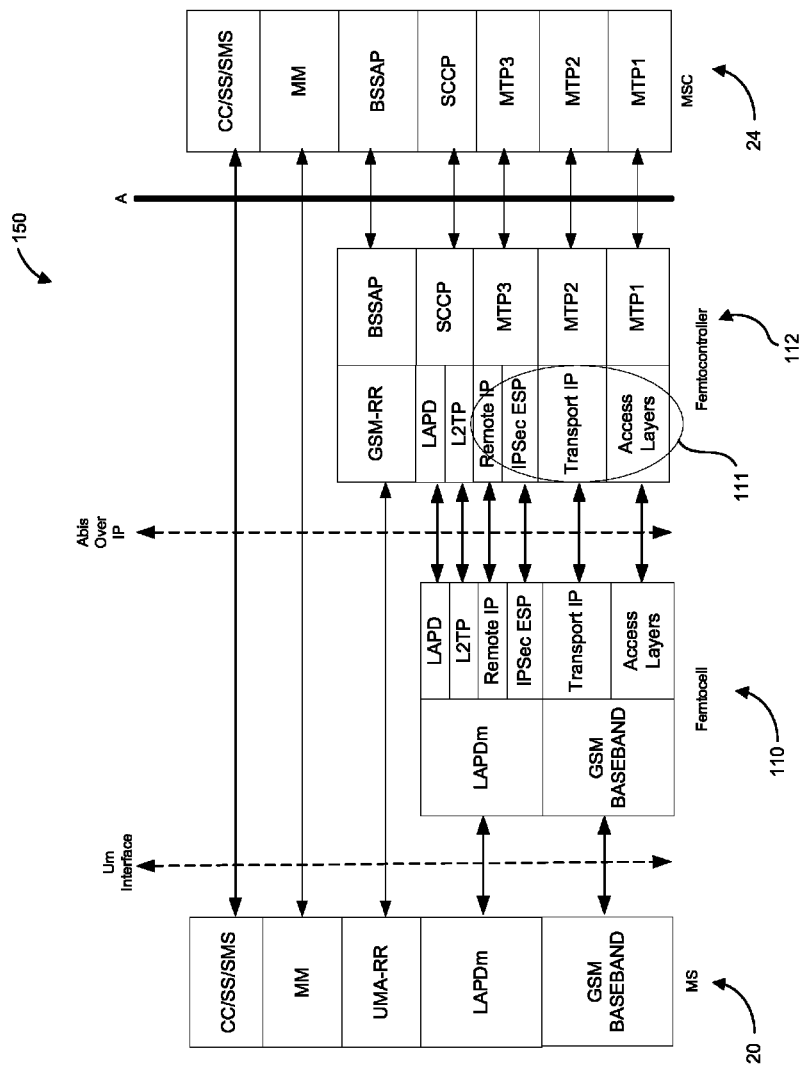
FIG. 4 shows a protocol stack for femtocell communications between the mobile device and the MSC.

Reference is now made to FIG. 4, which shows a protocol stack 150 for Femtocell communications between the GAN device 20 and the MSC 24. The connection is established over the femtocell 110 and femtocontroller 112 via the FSGW 111, with the Abis over IP protocol transparent tunneling of the cellular interface that terminates in the MSC 24. The femtocontroller 112 appears to the MSC 24 as though it were the base station 18 access network (FIG. 3).

Figure 5:
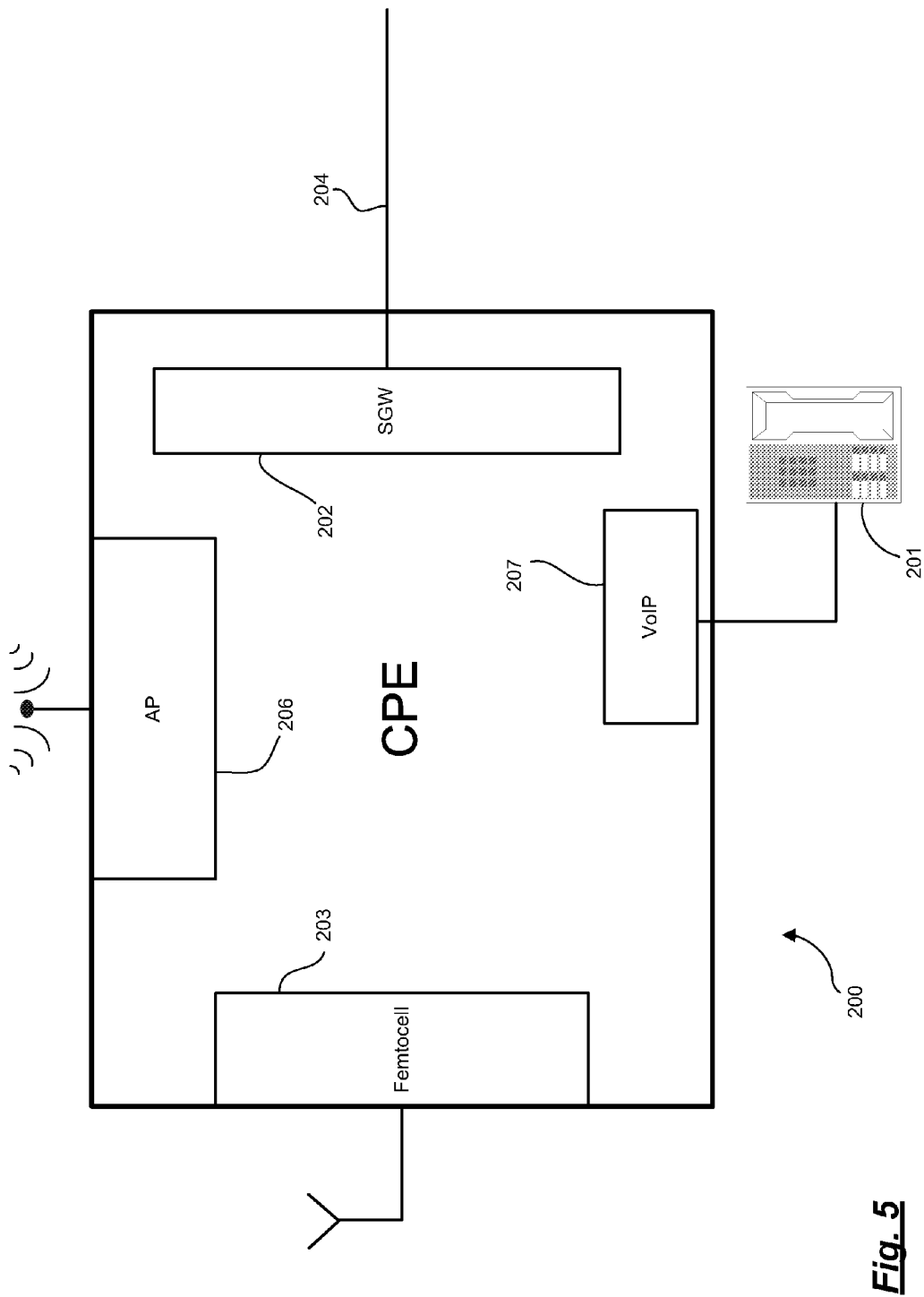
FIG. 5 shows, in block diagram form, an example embodiment of customer premises equipment (CPE)

Referring now to FIG. 5, an example of consumer premises equipment (CPE) 200 is shown in block diagram form. The CPE 200 includes a licensed frequency interface, which in this embodiment is a femtocell 203, and an unlicensed frequency interface, which in this embodiment is a WiFi AP 206. In the description of example embodiments that follow, reference will be made to CPEs that include a femtocell and an AP. This is not intended to limit the scope of the present application to CPEs that include a femtocell and 802.11 AP. It will be understood from the present application that the licensed frequency interface includes femtocells and similar devices configured to communicate with mobile devices over licensed frequencies, and that the unlicensed frequency interface includes 802.11 APs and similar devices configured to communicate with mobile devices over unlicensed frequencies, whether using 802.11 protocols or other communications protocols for unlicensed frequency communications.

The CPE 200 also includes a security gateway 202. The security gateway 202 may logically implement the layers shown in FIGS. 3 and 4 as being part of the femtocell 203 providing IPSec connectivity with the FSGW 111. In some cases, the femtocell 203 may include its own security gateway functionality terminating the IPSec tunnel.

The CPE 200 may, in some embodiments, also include a VoIP (Voice over IP) module 207 for connection with a Plain Old Telephone Set (POTS) (201) configured to use VoIP protocols and the security provided by the IPSec tunnel. This VoIP connectivity can be expanded to include IPBX interworking in some embodiments.

The CPE 200 includes a data connection 204 with the public IP network 12, for example, using DSL, ADSL, cable modem, T1, or other such connections. The data connection 204 provides the physical, access and transport layer connection to the public IP network 12. The security gateway 202 is configured to manage the setup and tear-down (if needed) of an IPSec connection to, for example, the FSGW 111.

In some implementations, the CPE 200 is a single physical device encapsulating these features. In some other implementations, the CPE 200 is two or more physical devices connected together.

Figure 6:
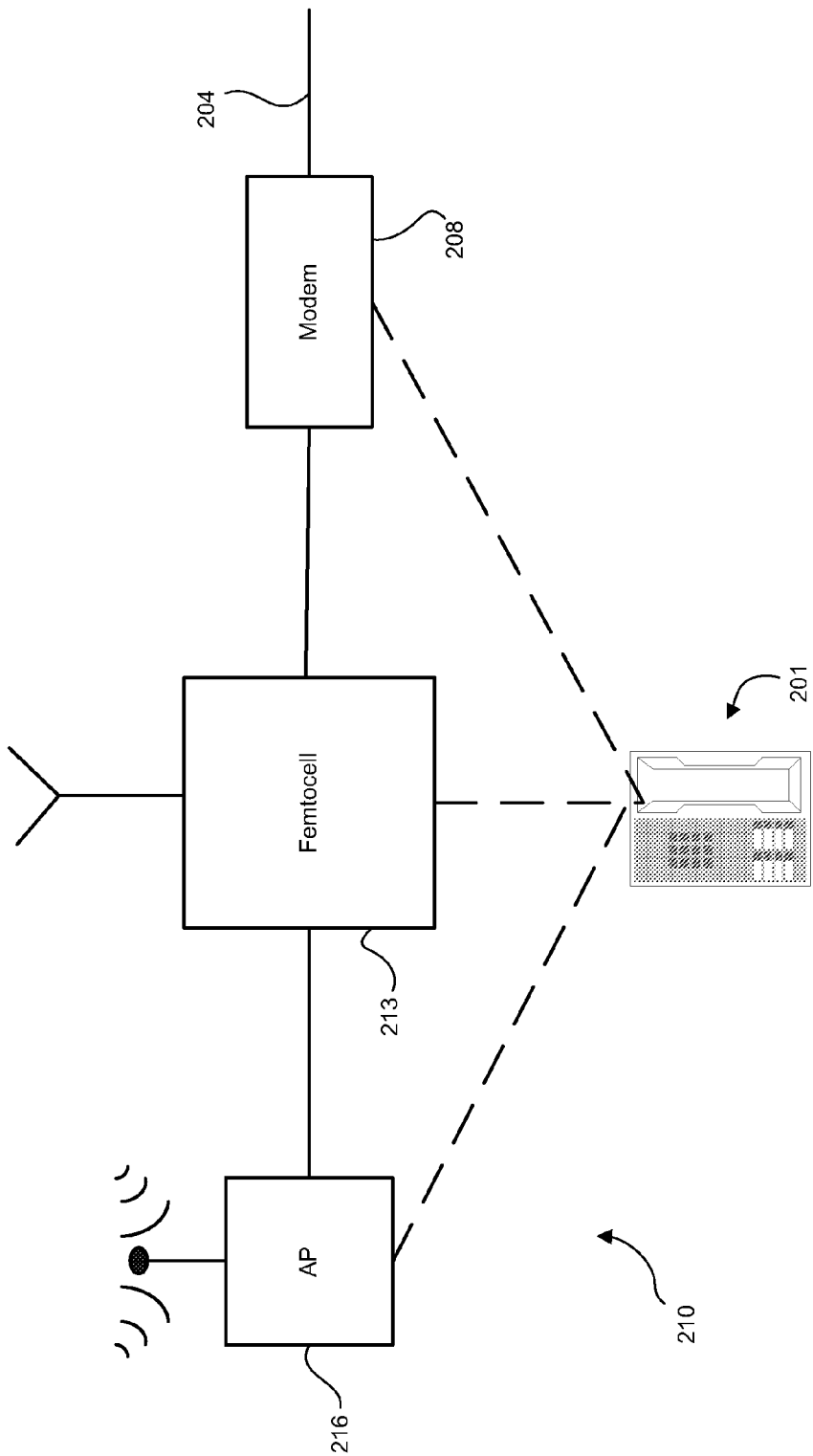
FIG. 6 shows an alternative embodiment of CPE.

One alternative embodiment of a CPE 210 is diagrammatically shown in FIG. 6. The CPE 210 in this embodiment includes an enhanced AP 216, an enhanced femtocell 213, and an enhanced modem 218. The POTS (201) configured for VoIP communications may be connected to any of the enhanced AP 216, the enhanced femtocell 213, or the enhanced modem 218, provided those devices provide for a VoIP connection port. In this regard "enhanced" refers to the fact that these devices 216, 213, 218, have been provided with VoIP port capabilities. In this embodiment, the security gateway 202 (FIG. 5) may be implemented within the modem 208 or the femtocell 213. Accordingly, the IPSec tunnel established over the data connection 204 may terminate in either the modem 208 or the femtocell 213. Services accessing the IPSec tunnel for secure communications therefore need to be routed to the device terminating the IPSec tunnel. For example, the VoIP POTS 201, if using the IPSec tunnel, needs to route communications to the femtocell 213 or modem 208, as the case may be. The femtocell 213 will have established the IPSec tunnel in order to support secure communications with the FSGW 111 (FIG. 3), but may, in some embodiments, have done so using a security gateway in the modem 208 provided that communications between the femtocell 213 and modem 208 are secure.

In accordance with one aspect of the present application, the IPSec tunnel established to support the femtocell 213 in CPE 200 may be re-used for UMA communication via the AP 216. In other words, a GAN/UMA device that sets up UMA communications with the MNO network via the AP may be directed to use the existing IPSec tunnel between the femtocell 213 and the MNO network instead of establishing and/or maintaining a second IPSec tunnel between the GAN device and the MNO network. This may relieve the GAN device of the burden and overhead associated with IPSec, which may save battery life.

Figure 7:
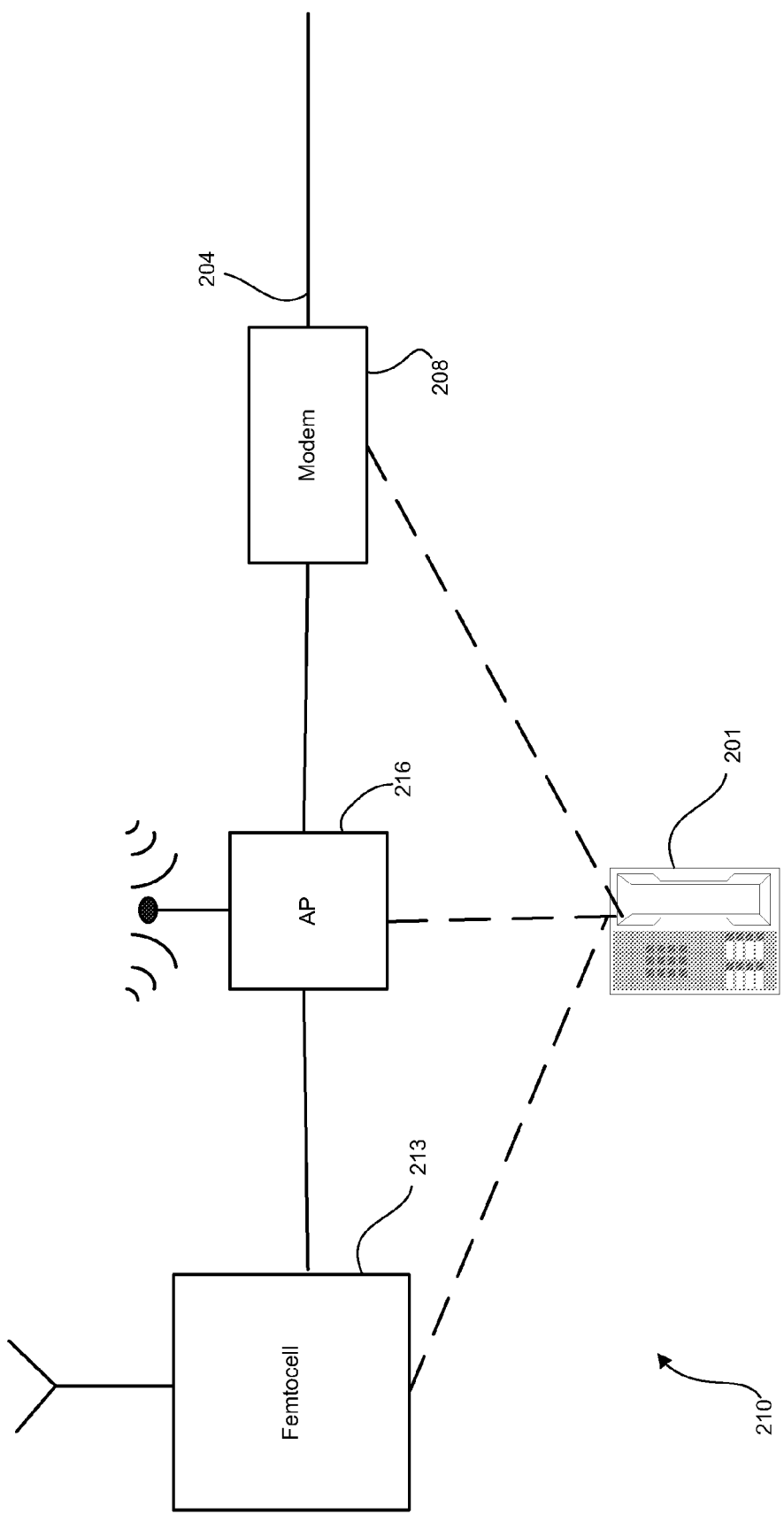
FIG. 7 shows a rearrangement of the elements of the example CPE of FIG. 6.

IPSec re-use may be initiated by the MNO network upon determining that a UMA session or service has been established over a second IPSec tunnel from a CPE equipped with a femtocell that already has an IPSec tunnel established. The MNO network may redirect the GAN device to use the existing IPSec tunnel for UMA communications. The MNO network may detect or determine that the second IPSec tunnel has been established via a CPE equipped with a femtocell using a number of possible techniques as described in detail below. FIG. 7 shows the devices of FIG. 6 rearranged in an alternative configuration. In this configured, the AP 216 may include a router. GAN/UMA communications over the WiFi connection to the AP 216 may be routed to the femtocell 213 to access the existing IPSec tunnel.

Figure 8:
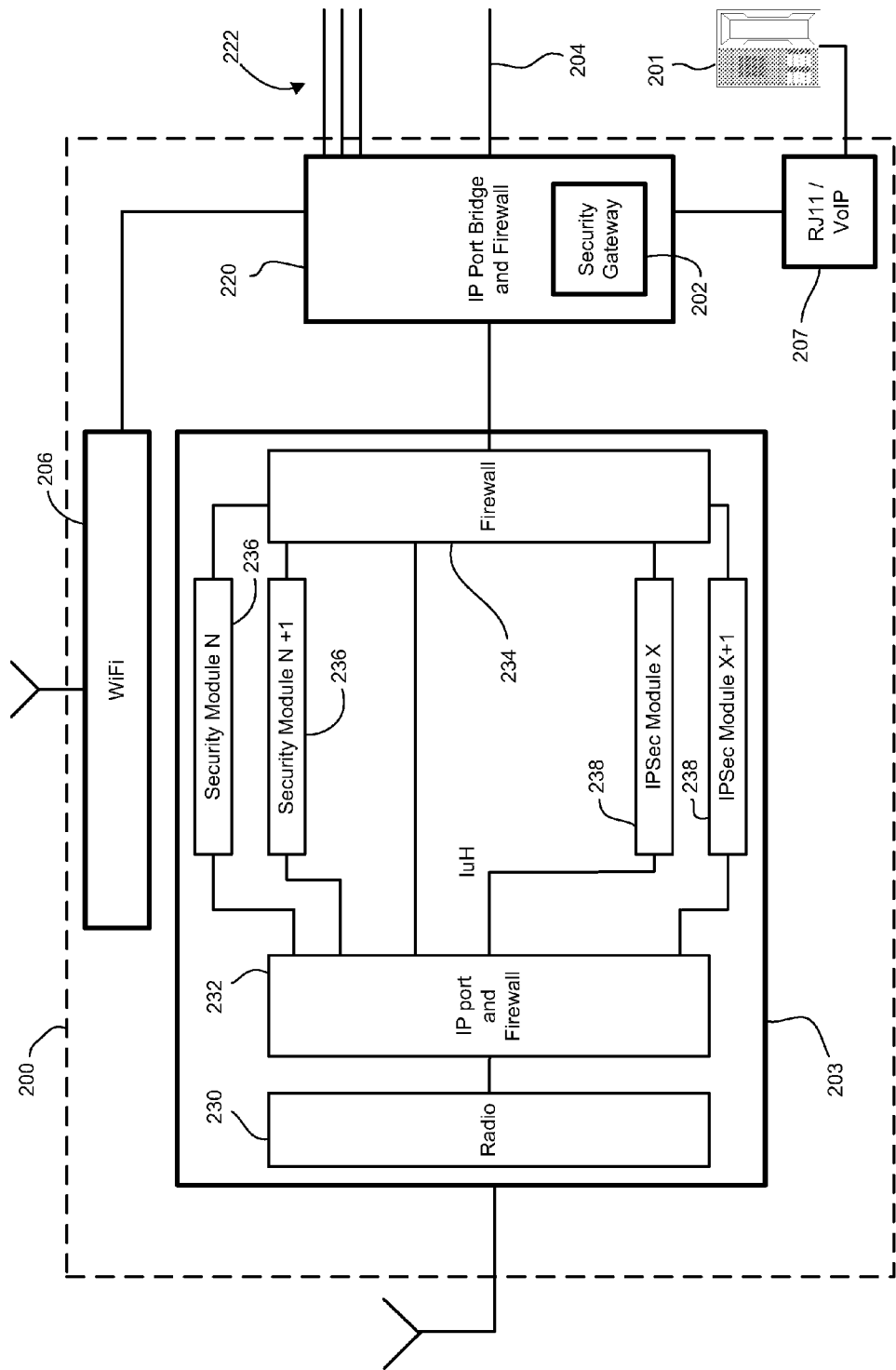
FIG. 8 shows, in block diagram form, an example embodiment of the CPE in greater detail.

Reference is now made to FIG. 8, which shows, in block diagram form, an example embodiment of the CPE 200 in greater detail. The CPE 200 includes the femtocell 203 and the AP 206. The CPE 200 further includes an IP port bridge and firewall 220 interconnecting the femtocell 203, the AP 206 and the data connection 204. In this embodiment, the IP port bridge and firewall 220 also connect to an RJ11/VoIP interface for connection to the VoIP POTS 201. The IP port bridge and firewall 220 implement the local security gateway 202. As noted above in connection with FIG. 5, in some instances the local security gateway 202 may terminate an IPSec tunnel established over the data connection 204. In other embodiments, as illustrated in this case, the IPSec tunnel may be terminated within the femtocell 203 and the IPSec tunnel may traverse the security gateway 202. In some cases, the IP port bridge and firewall 220 may also provide one or more local IP ports 222, such as Ethernet ports, for connecting to local devices, such as a computer or LAN.

The IP port bridge and firewall 220 may provide local breakout of IP services, whether in a home or enterprise.

The femtocell 203 includes a radio resource module 230 for implementing the RF communications and protocols associated with licensed frequency communications. It also includes an IP port and firewall 232 and 234. The femtocell 203 includes one or more security modules 236 and, specifically, one or more IPSec modules 238. The IPSec module 238 in particular implements the IPSec protocols for securing IP communications between the femtocell 203 and the FSGW 111 (FIG. 3) in the MNO network 14 (FIG. 3). The security modules 236 may implement one or more security policies. For example a given security module 236 may govern access to the IPSec tunnel for traffic routed from the VoIP POTS 201.

It will be understood, in light of the present description, that various functional components shown in FIG. 8 may be rearranged to provide the same capabilities.

Figure 9:
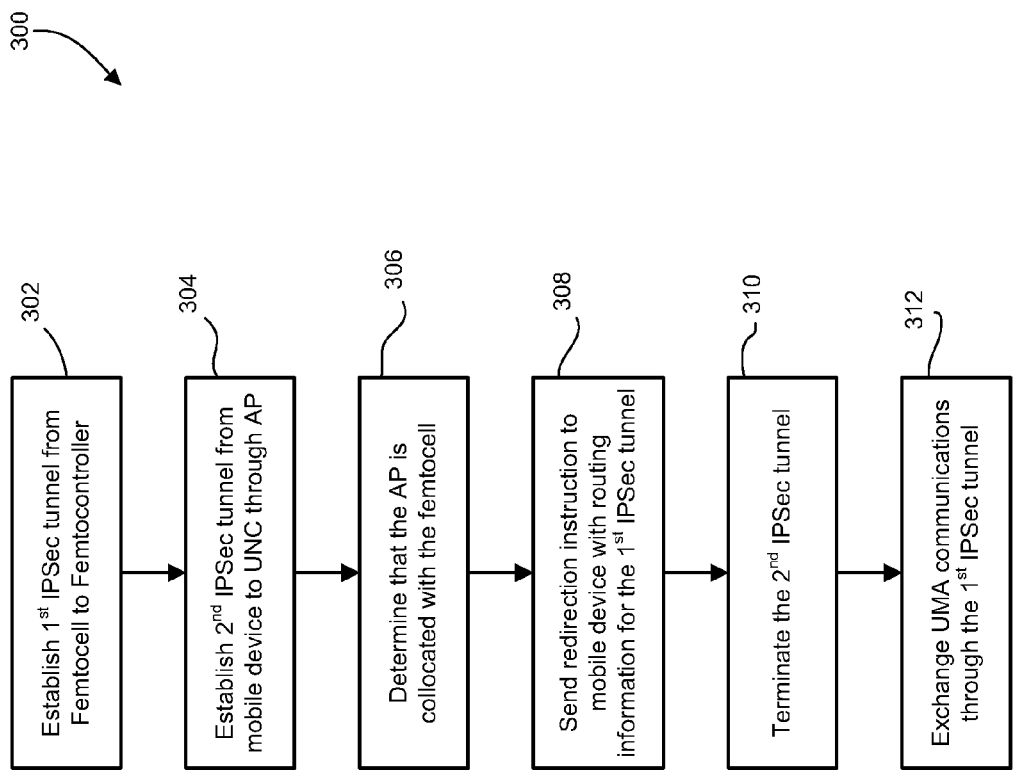
FIG. 9 shows, in flowchart form, an example method for IPSec re-use.

Reference is now made to FIG. 9, which shows, in flowchart form, an example method 300 for IPSec re-use. The method 300 begins in operation 302 with establishing a first IPSec tunnel from the femtocell to the femtocell secure gateway, FSGW, within the MNO network. The first IPSec tunnel is established through the normal provisioning and set-up process for the femtocell. Later, a mobile device connects to the access point over unlicensed frequencies, e.g. using WiFi protocols, and establishes a second IPSec tunnel from the mobile device to the UNC in the MNO network in operation 304. The mobile device specifically establishes the second IPSec tunnel with the SGW, which may be collocated with the UNC in some embodiments.

The SGW with which the mobile device establishes the second IPSec tunnel, in some embodiments, is configured to determine whether the access point is collocated with a femtocell in common customer premises equipment. In some embodiments, the UNC may make this determination. This determination may be based upon location information stored in the MNO network in some embodiments. In some other embodiments, it may be based on correlating IP address information for the two IPSec tunnels. The storage of the location information and the making of the determination regarding collocated femtocells and access points may be implemented in a number of network elements. For the purposes of this example, it is assumed that the determination is made by the UNC to which the mobile device is connected.

In one example, the determination that the IPSec tunnels originate from common customer equipment is based on IP address correlation. For example, when the CPE establishes an IP data connection 204 (FIG. 5) to the IP network, it is allocated a public IP address. In the case of IPv4, the CPE may include a router with NAT functionality such that communication originating from the AP 206 (FIG. 5), the femtocell 203 (FIG. 5) or the VoIP module 207 (FIG. 5) all share the same IP address from the point-of-view of the IP network, although they may have different port numbers. The NAT within the CPE may translate the public IP and port information into private IP addresses for use in routing communications within the CPE to the appropriate component. Accordingly, all communications from the CPE may use a common public IP address, including those for the two IPSec tunnels.

In the case of IPv6, the public IP address of the CPE may be related to the IP addresses of all the interfaces within the CPE, like the AP 206 and femtocell 203, because the CPE and internal interfaces share a common prefix, and the interfaces are specified by the subnet portion of the IPv6 address. In this case, the MNO network is able to determine that the AP is collocated with the femtocell on the basis that the prefix portion of the public IP addresses for the two IPSec tunnels are identical.

Separately, or in some cases together with the IP address-based determination, the MNO network may use location data and/or stored associations to determine that the AP is collocated with the femtocell. For example, the access point location information may include explicit location information, including GPS data collected by the mobile phone or GPS data collected by the access point. It may include implicit location information such as explicit or implicit customer identifiers, including name, address, IP address, telephone number, or other such data from which the UNC may find location information in a database storing associations between customer identifiers and locations or CPEs. In some cases, the location information is information identifying the CPE, such as a serial number or other identifier. If the location information identifies the CPE, then the UNC may determine whether the CPE is of a type that has a femtocell and, thus, whether it has an existing IPSec tunnel supporting femtocell communications. Similarly, if the UNC determines, from location information and one or more stored associations within the MNO network, that the access point is located in the same premises as the femtocell, then the UNC may attempt to identifying an existing IPSec tunnel supporting the femtocell communications. In this regard, the MNO network stored associations, such as an association between a customer or customer location and a femtocell identifier, or an association between particular customer premises equipment and a femtocell identifier. The femtocell identifier is an identifier directly or indirectly useful for locating the IPSec tunnel. For example, the femtocell identifier may be associated with IPSec tunnel data, such as the IP address and port number for the IPSec tunnel within the CPE and within the MNO network.

In one embodiment, the GAN device may report location information obtained from listening to beacon/broadcast signals. For example, the GAN device may obtain MCC, MNC, or base station identification information. In one possible embodiment, the GAN device may be receive and report femtocell information obtained from the femtocell broadcast message. It will be appreciated that in such circumstances, the GAN device may simply roam to the femtocell rather than establishing UMA communications; however, there may be circumstances in which the GAN device is configured to prefer UMA communications over available femtocell access.

In many instances, the GAN device may be unable to receive femtocell broadcast messaging; for example, if the GAN device is not configured to use the same frequencies used by the femtocell, or the GAN device is not part of a closed subscriber group specified for the femtocell.

Based upon IP address correlation and/or stored associations and/or location information within the MNO network, referring to operation 306, the UNC determines that the access point is collocated with a femtocell having an existing IPSec tunnel, and the IP address information for accessing the IPSec tunnel. The UNC then, in operation 308, redirects the mobile device to use the first IPSec tunnel established by the femtocell. It will be appreciated that this could result in unsecured communications over the unlicensed frequencies from the mobile device to the access point, since the first IPSec tunnel terminates in the customer premises equipment. Accordingly, in response to the redirection message or command, the mobile device, if it has not already, secures communications with the access point. The communications with the access point may be secured using any suitable encryption protocol, including WPA2, etc. The femtocell in the CPE may test the security association, and if it meets the defined requirements, allow UMA traffic from the UMA device to have access to the first IPSec tunnel.

In response to the redirection message, the mobile device addresses UMA communications to the IP address for the first IPSec tunnel. This IP address is provided to the mobile device by the UNC in the redirection message. Similarly, the UNC routes traffic addressed to the mobile device through the first IPSec tunnel, using the FSGW, as noted in operation 312.

The second IPSec tunnel becomes redundant because of the re-use of the first IPSec tunnel. Accordingly, in operation 310, the second IPSec tunnel is terminated. The UNC SGW may allow the second IPSec tunnel to time out. In some embodiments, once UMA communications are successfully established through the first IPSec tunnel, the UNC SGW may be instructed to terminate the second IPsec tunnel.

Figure 10:
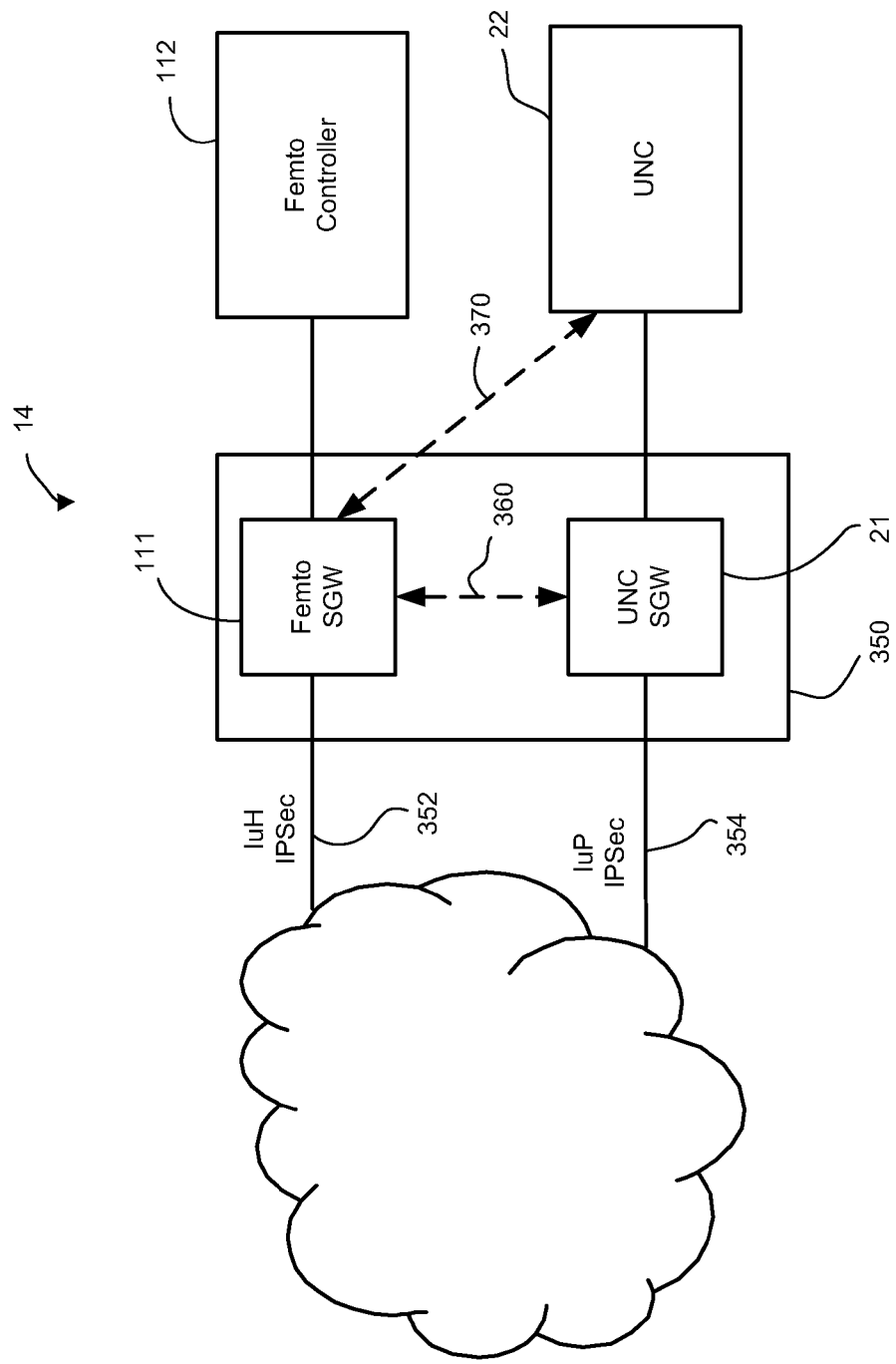
FIG. 10 diagrammatically shows an embodiment of the MNO network.

Reference will now be made to FIG. 10, which diagrammatically shows an embodiment of the MNO network 14. The MNO network 14 includes the UNC 22 and the femtocontroller 112. It also includes the FSGW 111 and the UNC SGW 21, which may, in some embodiments, be collocated in a common SGW 350.

The FSGW 111 is an endpoint for the first IPSec tunnel 352 established with the femtocell. The UNC SGW 21 is an end point for the second IPSec tunnel 354 established with the mobile device connected over the access point.

As indicated by reference numeral 360, the UNC SGW 21 and FSGW 111 may share IP address and/or location related data for the purpose of identifying or determining whether the access point (unlicensed frequency interface) and femtocell (licensed frequency interface) are collocated in a common CPE. In the case of IPSec tunnel re-use, where the UMA communications re-use the first IPSec tunnel 352, UMA communication may be exchanged between the FSGW 111 and UNC 22 using upper layers of the Up protocol stack 370. The FSGW 111 routes the UMA traffic to the correct UNC, where there is more than one. The MNO network logic can determine the correct UNC prior to reassignment or it can be based on IP address mapping when the FSWG 111 and UNC SGW 21 are controlled by the same operator.

The GAN device may store information regarding the femtocell and/or its IPSec tunnel so that, in the future, when it attempts to access the same CPE it may first attempt access through the femtocell IPSec tunnel, instead of setting up a second IPSec tunnel and relying on the MNO network to detect the association and switch UMA communications over the to the first IPSec tunnel. This should speed up the connection process and improve handover time for active services on the GAN device.

Figure 11:
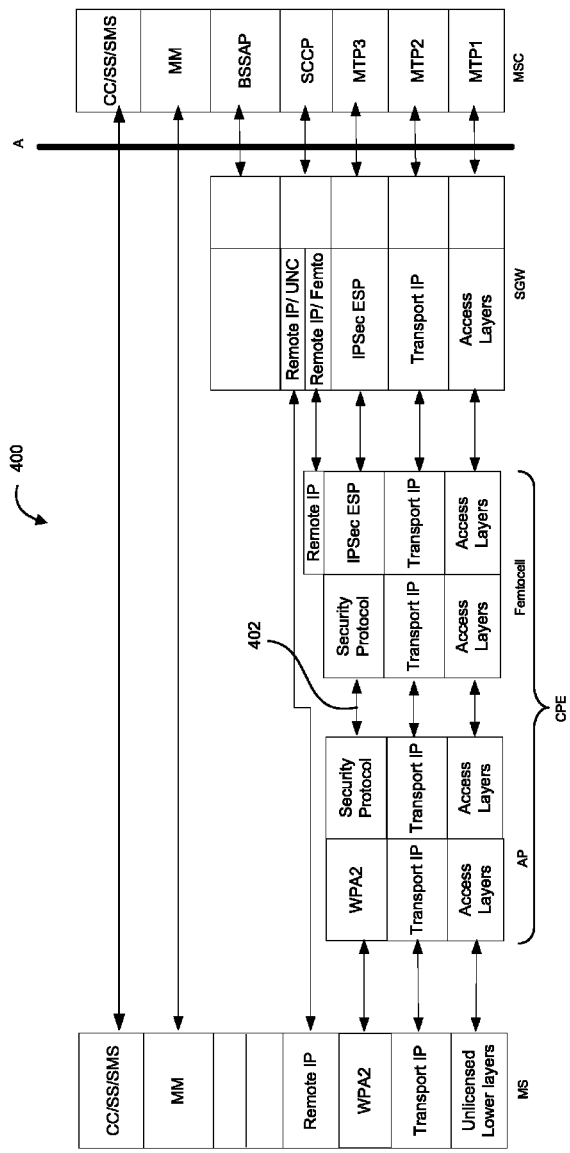
FIG. 11 shows the enhanced protocol stack used by the UMA device as it re-uses the femtocell IPSec tunnel.

Reference is now made to FIG. 11, which shows the enhanced protocol stack 400 used by the UMA device as it re-uses the femtocell IPSec tunnel. In this example WiFi Personal Access 2 (WPA2) (ref y) security is shown, but any WiFi security can be used as determined by the MNO and the mobile device that meets the security required for their requirements or as determined by regulatory statutes. FIG. 11 also shows a Security Protocol 402 that provides the security association into the femtocell. For brevity, it is shown in the enhanced AP but it will be understood that this functionality could be placed in the UMA device in some embodiments and that various security associations are possible. For example, the WPA2 protocol may be passed through to the femtocell as the security association. This protocol requires authentication and port assignment based upon the Radius servers used by the SGW. Reusing the WiFi Access security may simplify the protocols and the implementation of the CPE.

Figure 12:
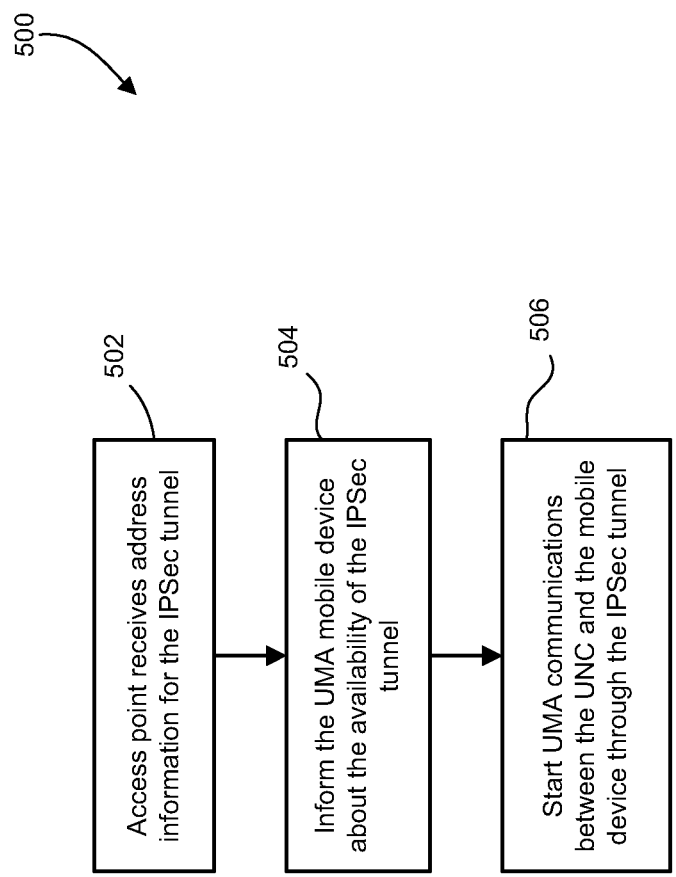
FIG. 12 shows another example method of IPSec re-use in flowchart form.

Another example method 500 of IPSec re-use is shown in flowchart form in FIG. 12. In this example embodiment, the AP is configured to advertize the availability of the existing IPSec tunnel. In some unlicensed frequency communications protocols, such as, for example, a draft standard for IEEE 802.11u, provision may be made for adding custom data to a broadcast message or beacon. In this case the fact that an existing IPSec tunnel is available may be indicated by way of a flag or other indicator. In some embodiments, the IP address of the tunnel may be inserted in the broadcast message. In yet other embodiments, the IP address of the IPSec tunnel may only be communicated to a mobile device once a secure connection has been established.

In some cases, the existing IPSec tunnel is established for a femtocell. In some other cases, the IPSec tunnel is established for another communication device, such as a POTS device using VoIP. A UMA device that receives the advertized IPSec information can use this to try and route communications to the IPSec tunnel already established. Broadcast messages normally used in the unlicensed frequency protocol, for example, 802.11u, may be used to provide information to the UMA device, like the availability of an existing IPSec tunnel, the operator, etc. The UMA device may use this information to access the security gateway associated with the CPE or the security gateway located in the MNO network as defined by profile settings provided by the operator.

As noted in FIG. 12, the AP receives address information for the existing IPSec tunnel terminated in the CPE in operation 502. The address information may be received directly from the femtocell, in one embodiment, if the femtocell/CPE is configured to share IPSec tunnel information with the AP for the purpose of allowing IPSec re-use. In another embodiment, the address information may be received from the UNC, such as after detection of a collocated femtocell IPSec tunnel using a process such as that described above in connection with FIG. 9.

The AP then broadcasts the address information and IPSec availability in operation 504. The broadcast may include placing the information in a beacon frame or other such broadcast message. It may, in some embodiments, be advertized to the UMA device only once the UMA device requests access to the AP. In some examples, the IPSec information may be sent in an authentication response frame, an association response frame, a probe response frame, or other such AP-originated frames. It will be understood that in some embodiments the standard-defined format and content of some such frames may prohibit inclusion of the IPSec availability and/or address information. Nevertheless, the present application includes the possibility of changes to the currently-prevailing standards to permit inclusion of such information in these types of communications.

The UMA device then connects to the AP and initiates communications with the UNC via the existing IPSec tunnel, as indicated by operation 506. It will be understood that the AP may authenticate or otherwise determine whether to permit the UMA device to access the IPSec tunnel for UMA communications. Operation 506 may further include establishing encryption, such as WPA2, for communications between the UMA mobile device and the CPE. As noted above, IP address and other information related to the IPSec tunnel may only be provided to the mobile device after it connects and establishes secure communications, in some embodiments.

Figure 13:
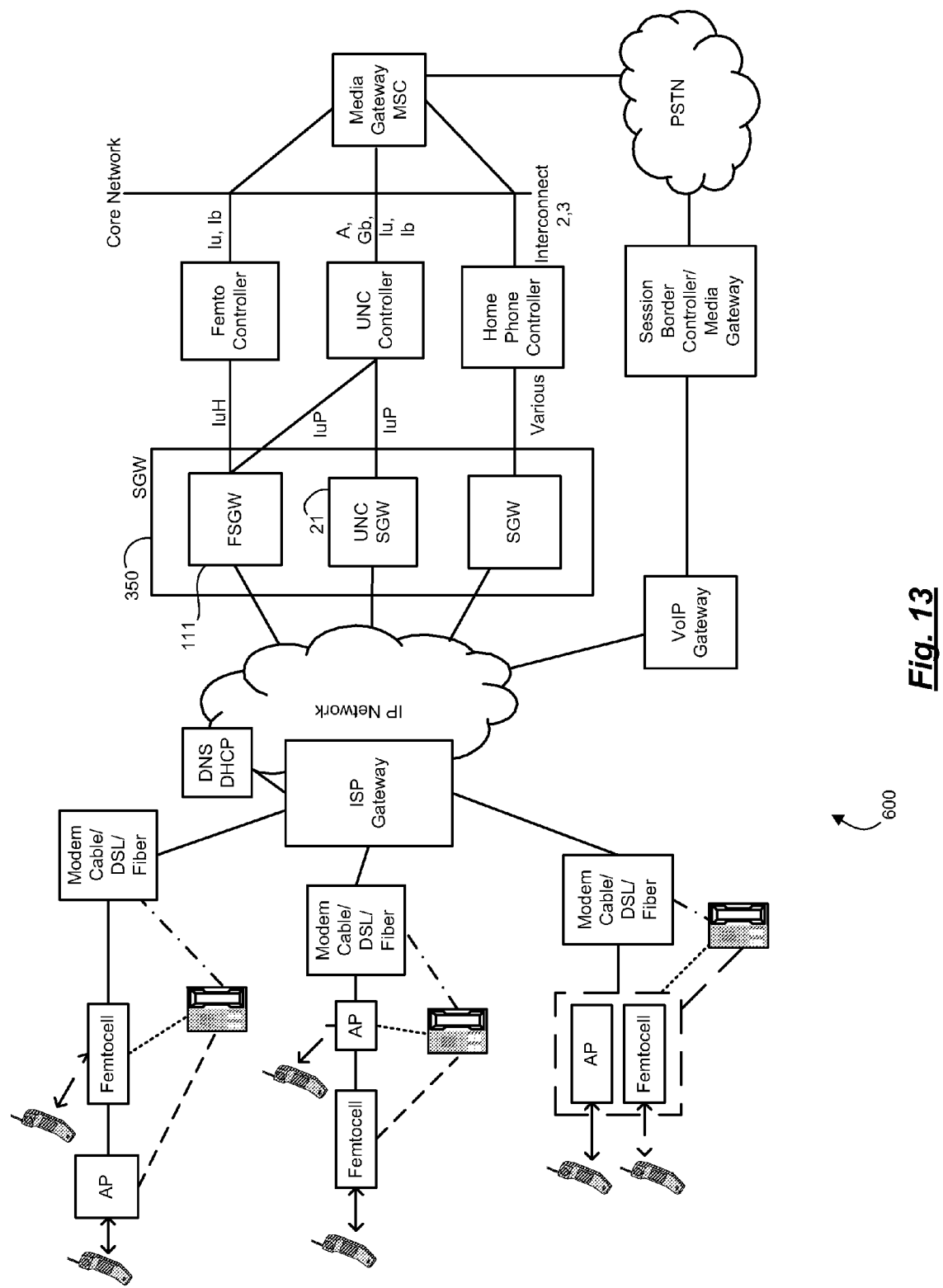
FIG. 13 diagrammatically illustrates one example system for IPSec tunnel re-use.

Reference is now made to FIG. 13, which diagrammatically illustrates one example system 600 for IPSec tunnel re-use.

Figure 14:
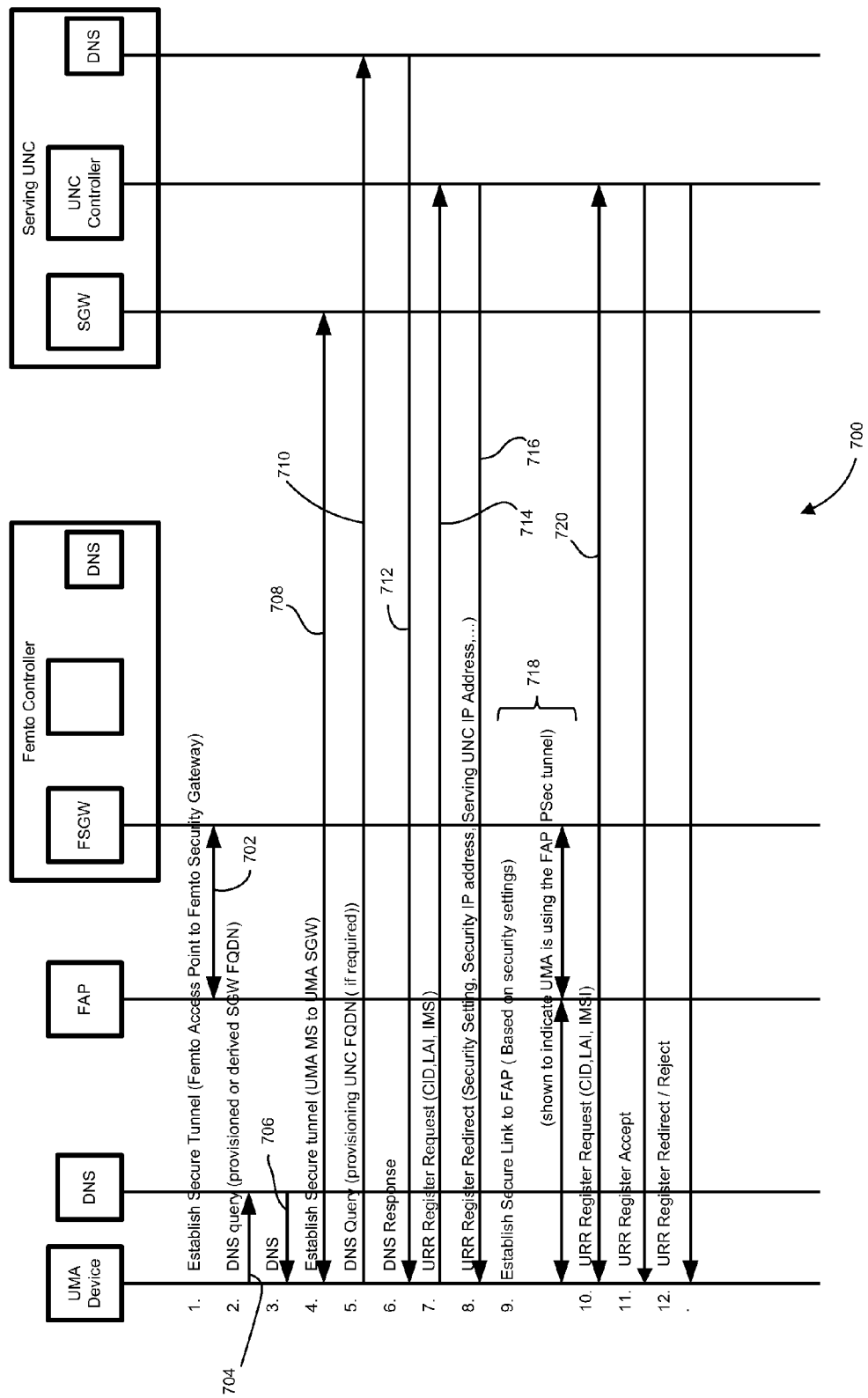
FIG. 14 shows an example signaling diagram for IPSec tunnel re-use.

FIG. 14 shows an example signal diagram 700 for IPSec tunnel re-use. The example signal diagram is based upon a UMA device attempting for the first time to join a femtocell IPSec tunnel. As shown in FIG. 14, the femtocell establishes its IPSec connection with the FSGW (702). The UMA device attempts to connect to its serving UNC by providing a Fully Qualifed Domain Name (FQDN) (704) or an IP address of the SWG used by the UNC. The DNS may return an IP address of the FQDN (706), or provide other information which will be used by the UMA device. On return of a valid IP address, the UMA device attempts to set up an IPSec connection and tunnel with the UNC SGW (708). Once complete, it will do a query (DNS of the Serving UNC) for the provisioned UNC it has in its memory (710). The DNS will return an address of the Serving UNC (712). The UMA device sends a register message (714) including information regarding it surroundings, i.e. AP SSID, AP IP address, Cell ID information of the marcocellular system, (Mobile country code, Mobile Network Code, Location Area Identifier, its mobile Identification), and/or other location information. The UNC controller may have additional information that is gathered from the femtocell controller and FSGW. The UNC determines that the UMA device is connected to an AP collocated with a femtocell for which an IPSec tunnel is already established. The determination that the AP and femtocell are collocated may be based upon IP addresses, location data, or stored association, or a combination thereof, as described in greater detail above. It is noted that the femtocell may use wireless frequencies that the UMA device is not configured to use, such that the UMA device cannot enter the Femtocell or may not be part of its Closed User Group.

The logic implemented at the UNC, or elsewhere in the MNO network, has operator policies which are used to gate whether the UMA device can re-use the femtocell IPSec service, and other services supported by the femtocell. If the logic allows IPSec re-use, then the UNC will redirect (716) the UMA device to a new IP address or FQDN and provide additional information regarding the security setting to use to connect to the existing IPSec tunnel. The UMA device establishes a secure connection routed to the femtocell SGW (718), as described above. One the security association is established, the UMA device has access to the established IPSec tunnel. The UMA device provides a Register request (720) based upon the information provided by the UNC in signal 716. The UNC accepts (722) and the UMA device is now connected to the Mobile Core network. Additionally, if operator policies allow, the UMA device may have access to local breakout services provided by the femtocell.

It will be understood that although many of the foregoing embodiments related to provision of UMA services to a device through Femto-based IPSec re-use, that the existing IPSec tunnel may be re-used for a variety of services, including VoIP and other.

It will be appreciated that the operations described in the present application may be implemented in a number of computing devices, including, without limitation, servers, suitably programmed general purpose computers, and mobile devices. The operations may be implemented by way of software containing instructions for configuring a processor to carry out the functions described herein. The software instructions may be stored on any suitable computer-readable memory, including CDs, RAM, ROM, Flash memory, etc.

The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of providing unlicensed mobile access (UMA) service at a customer location, the customer location having customer premises equipment connected to a public IP network, wherein the customer premises equipment includes a licensed frequency interface and an unlicensed frequency interface, the method comprising:
    establishing a first IPSec tunnel from the customer premises equipment to a secure gateway within a mobile network operator (MNO) network over the public IP network to support communications over the licensed frequency interface;
    establishing a second IPSec tunnel from a dual-mode mobile device to a UMA network controller (UNC) via the unlicensed frequency interface, for a UMA service;
    determining that the unlicensed frequency interface is collocated with the licensed frequency interface in the customer premises equipment;
    sending, as a consequence to said determining, to the dual-mode mobile device a redirect message instructing the mobile device to route communications relating to the UMA Service through the first IPSec tunnel; and
    receiving communications relating to the UMA Service through the first IPSec tunnel and routed via the secure gateway to the UNC.

2. The method claimed in claim 1, wherein the first IPSec tunnel has a first public IP address for the customer premises equipment, and wherein the second IPSec tunnel has a second public IP address for the dual-mode mobile device, and wherein determining comprises determining that the first public IP address is associated with the second public IP address.

3. The method claimed in claim 2, wherein determining that the first public IP address is associated with the second public IP address comprises determining that the first public IP address is identical to the second public IP address.

4. The method claimed in claim 2, wherein determining that the first public IP address is associated with the second public IP address comprises determining that the first public IP address and the second public IP address have a common prefix.

5. The method claimed in claim 1, wherein the MNO network stores location data for the licensed frequency interface, wherein the MNO network receives location information from the dual-mode mobile device via the unlicensed frequency interface, and wherein determining comprises comparing the location data for the licensed frequency interface with the location information.

6. The method claimed in claim 5, wherein the location data comprises at least one of Mobile Country Code, Mobile Network Code, Base station identifier, and GPS data, received by the licensed frequency interface from a public wireless network base station.

7. The method claimed in claim 5, wherein the location information comprises at least one of Mobile Country Code, Mobile Network Code, Base station identifier, and GPS data, received by the mobile device from a public wireless network base station.

8. The method claimed in claim 1, wherein determining comprises determining based on a stored association within the MNO network, and wherein the stored association includes a first association between the licensed frequency interface and the customer location and a second association between the unlicensed frequency interface and the customer location.

9. The method claimed in claim 1, wherein the licensed frequency interface comprises a femtocell.

10. The method claimed in claim 1, wherein the unlicensed frequency interface comprises a WiFi access point.

11. The method claimed in claim 1, further comprising storing data regarding the first IPSec tunnel in memory on the mobile device and, subsequently, using the stored data regarding the first IPSec tunnel to request access to the UNC via the first IPSec tunnel when attempting to reconnect to the UNC over the customer premises equipment without re-establishing the second IPSec tunnel.

12. A method of providing unlicensed mobile access (UMA) service to a dual-mode mobile device at a customer location, the customer location having customer premises equipment connected to a public IP network, wherein the customer premises equipment includes a licensed frequency interface and an unlicensed frequency interface, the method comprising:
    establishing an IPSec tunnel from the customer premises equipment to a secure gateway within a mobile network operator (MNO) network over the public IP network to support communications over the licensed frequency interface;
    broadcasting a broadcast message via the unlicensed frequency interface, wherein the broadcast message includes an indicator advertising the availability of the IPSec tunnel;
    receiving a request for UMA services from the mobile device via the unlicensed frequency interface;
    routing communications relating to the UMA service through the IPSec tunnel to a UMA network controller in a mobile core network.

13. A mobile network server, providing unlicensed mobile access (UMA) service at a customer location, the customer location having customer premises equipment connected to a public IP network, wherein the customer premises equipment includes a licensed frequency interface and an unlicensed frequency interface, wherein the customer premises equipment is configured to establish a first IPSec tunnel from the customer premises equipment to a secure gateway over the public IP network to support communications over the licensed frequency interface, the mobile network server comprising:
    a processor;
    a memory; and
    an application stored in memory and containing instructions for configuring the processor to
        establish a second IPSec tunnel from a mobile device to the mobile network server, via the unlicensed frequency interface, for a UMA service, determine that the unlicensed frequency interface is collocated with the licensed frequency interface in the customer premises equipment, send, as a consequence to said determining, to the mobile device a redirect message instructing the mobile device to route communications relating to the UMA service through the first IPSec tunnel, and receive communications relating to the UMA service through the first IPSec tunnel and routed via the secure gateway.

14. The mobile network server claimed in claim 13, wherein the first IPSec tunnel has a first public IP address for the customer premises equipment, and wherein the second IPSec tunnel has a second public IP address for the mobile device, and wherein the processor is configured to determine by determining that the first public IP address is associated with the second public IP address.

15. The mobile network server claimed in claim 14, wherein the processor is configured to determine that the first public IP address is associated with the second public IP address by determining that the first public IP address is identical to the second public IP address.

16. The mobile network server claimed in claim 14, wherein the processor is configured to determine that the first public IP address is associated with the second public IP address by determining that the first public IP address and the second public IP address have a common prefix.

17. The mobile network server claimed in claim 13, wherein the memory stores location data for the licensed frequency interface and location information from the dual-mode mobile device received via the unlicensed frequency interface, and wherein the processor is configured to determine by comparing the location data for the licensed frequency interface with the location information.

18. The mobile network server claimed in claim 17, wherein the location data comprises at least one of Mobile Country Code, Mobile Network Code, Base station identifier, and GPS data, received by the licensed frequency interface from a public wireless network base station.

19. The mobile network server claimed in claim 17, wherein the location information comprises at least one of Mobile Country Code, Mobile Network Code, Base station identifier, and GPS data, received by the mobile device from a public wireless network base station.

20. The mobile network server claimed in claim 13, wherein the mobile network server comprises a UMA network controller.

21. The method claimed in claim 12, further comprising sending an address of the IPSec tunnel to the unlicensed frequency interface.

22. The method claimed in claim 12, wherein the unlicensed frequency interface comprises an access point for said broadcasting.

* * * * *